US008351426B2

(12) United States Patent
Cadigan, Jr. et al.

(10) Patent No.: US 8,351,426 B2
(45) Date of Patent: Jan. 8, 2013

(54) ETHERNET VIRTUALIZATION USING ASSISTED FRAME CORRECTION

(75) Inventors: Michael J. Cadigan, Jr., Brewster, NY (US); Jeffrey M. Turner, Poughkeepsie, NY (US); Stephen R. Valley, Valatie, NY (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 12/052,238

(22) Filed: Mar. 20, 2008

(65) Prior Publication Data

US 2009/0238197 A1 Sep. 24, 2009

(51) Int. Cl.
*H04L 12/28* (2006.01)
*G06F 11/00* (2006.01)

(52) U.S. Cl. .......... 370/389; 370/412; 370/428; 714/48; 714/746

(58) Field of Classification Search ........................ None
See application file for complete search history.

(56) References Cited

U.S. PATENT DOCUMENTS

| | | | | |
|---|---|---|---|---|
| 5,513,191 A * | 4/1996 | Takechi et al. | ................. | 714/752 |
| 5,867,509 A * | 2/1999 | Tanaka | ........................... | 714/758 |
| 6,202,105 B1 * | 3/2001 | Gates et al. | ...................... | 710/20 |
| 6,279,051 B1 * | 8/2001 | Gates et al. | ...................... | 710/20 |
| 6,959,411 B2 * | 10/2005 | Lin | ................................ | 714/763 |
| 7,047,000 B1 * | 5/2006 | Ojala | ........................... | 455/422.1 |
| 7,437,172 B2 * | 10/2008 | Chen et al. | ...................... | 455/522 |
| 7,483,429 B2 * | 1/2009 | Calvignac et al. | ............. | 370/392 |
| 7,636,832 B2 * | 12/2009 | Raj et al. | ........................ | 711/207 |
| 7,995,472 B2 * | 8/2011 | Calvignac et al. | ............. | 370/230 |
| 2003/0172326 A1 * | 9/2003 | Coffin et al. | ................... | 714/699 |
| 2004/0085962 A1 * | 5/2004 | Sugai et al. | .................... | 370/392 |
| 2004/0100954 A1 * | 5/2004 | Dai et al. | ........................ | 370/389 |
| 2005/0213500 A1 * | 9/2005 | Gaur | ................................ | 370/229 |
| 2005/0281287 A1 * | 12/2005 | Niinomi et al. | ................ | 370/474 |
| 2006/0150064 A1 * | 7/2006 | Waxman | ........................ | 714/776 |
| 2006/0168338 A1 * | 7/2006 | Bruegl et al. | .................. | 709/240 |
| 2006/0268927 A1 * | 11/2006 | Rodgers | ......................... | 370/464 |
| 2007/0027959 A1 * | 2/2007 | Harris et al. | ................... | 709/217 |
| 2007/0061681 A1 * | 3/2007 | Carmichael | .................... | 714/760 |
| 2007/0180330 A1 * | 8/2007 | Black et al. | ...................... | 714/42 |
| 2007/0206598 A1 * | 9/2007 | Yamada | .......................... | 370/392 |
| 2007/0273762 A1 * | 11/2007 | Steensma et al. | .............. | 348/143 |
| 2008/0019274 A1 * | 1/2008 | Droux et al. | ................... | 370/235 |
| 2008/0107116 A1 * | 5/2008 | Godiwala et al. | .............. | 370/394 |
| 2008/0243947 A1 * | 10/2008 | Kaneda | .......................... | 707/203 |
| 2009/0213857 A1 * | 8/2009 | Haynie et al. | .................. | 370/394 |
| 2009/0225665 A1 * | 9/2009 | Haynie et al. | .................. | 370/248 |
| 2010/0036668 A1 * | 2/2010 | El-Maleh et al. | .............. | 704/270 |

* cited by examiner

*Primary Examiner* — Robert Scheibel
*Assistant Examiner* — Hicham Foud
(74) *Attorney, Agent, or Firm* — Steven Chiu

(57) ABSTRACT

A method for Ethernet virtualization using assisted frame correction. The method comprises receiving at a host adapter data packets from a network, storing the received data packets in host memory, storing the received data packets in a hardware queue located on the host adapter, setting a status indicator reflecting the status of the data packets based on results of the checking, and sending the status indicator to the host memory.

19 Claims, 9 Drawing Sheets

TABLE 1

| EVENT/CONDITION | DESCRIPTION |
| --- | --- |
| ☐ GENERAL ETHERNET ERRORS<br><br>TRANSMIT DEFERRAL<br>RECEIVER OVERRUN<br>LATE COLLISIONS<br>CARRIER SENSE LOST<br>SQE ERRORS<br>MULTIPLE COLLISIONS<br>SINGLE COLLISIONS<br>CRC ERRORS<br>EXCESSIVE COLLISIONS TRANSMIT UNDERRUNS<br>FRAME ALIGNMENT ERRORS | PHYSICAL ERRORS EITHER DEALING WITH DUPLEX ISSUES, PERFORMANCE OR CABLING PROBLEMS |
| DATA LENGTH ERROR | FRAMES EITHER TOO SMALL OR TWO LARGE FOR THE CARD TO RECEIVE |
| INTRUSION DETECTION EVENTS | ERRORS TRIGGERED BY MALICIOUS EVENTS |
| PARITY ERRORS | EXTENDED DATA CHECKING |
| IP ERRORS | HIGHER LEVEL PROTOCOL ERRORS SUCH AS IP CHECKSUM FAILURE OR MALFORMED IP PACKET |
| TCP ERRORS | HIGHER LEVEL PROTOCOL ERRORS SUCH AS TCP CHECKSUM FAILURE OR MALFORMED TCP PACKET |

FIG.9

ETHERNET VIRTUALIZATION USING ASSISTED FRAME CORRECTION

BACKGROUND OF THE INVENTION

This invention relates generally to network virtualization and, more particularly, to methods, systems, computer program products, and hardware products for implementing Ethernet virtualization.

Current LAN/WAN networks are becoming increasingly more complicated. LAN performance is increasing exponentially as network applications continue to generate large amounts of network traffic. In addition, there is a need to decrease response times. Each transaction is becoming more reliant on the underlying infrastructure. More traffic increases the frequency of LAN errors, both with the transport protocol and with the underlying physical medium.

BRIEF SUMMARY OF THE INVENTION

In one embodiment, the present application provides addresses LAN errors and recovery as it relates to network performance and latency. The present application provides a combination of new sophisticated hardware and lean software which can help meet the demands of future networks. Error conditions either physical or logical play a big role in the reliability and performance of present LAN/WANs. The techniques of the present application help reduce delays in a network which can help businesses reduce costs.

The present application provides a combination of new software and hardware which provide minimal impact to the application as errors are occurring. A hardware queue was developed that will manage all inbound packets as they are received from the LAN. For performance and latency reasons, the LAN data is written to the host as fast as this hardware queue can send it. Because of this, errors are sometimes not recognized until the data is already written to a host buffer. Therefore a new state bit was defined in the final status write to the host OS describing the data received as in error. The host operating system (OS) will then recognize that a packet is in error and will stop all processing on the packet, thus saving host cycles. Further complicating is the fact that input packets could span multiple host inbound data buffers. Because of this the hardware queue manages states as to what data blocks have been successfully written to the host and will automatically determine if other data writes must be invalidated as well.

The present application also provides new functionality including the ability to transfer data from the LAN directly to virtual-host memory. Current systems implement a "store and forward" approach to data transfer. In this mode, each packet is received from the LAN and "stored" in a buffer residing in the virtualization engine. This data is then transferred to the host in from this buffer. Because the packet actually stored, errors are easily recognized and thrown out prior to be "forwarded" to the host OS for processing. The present application provides an improved to detect and correct errors and events as they are received by the hardware. Examples of the types of errors and events that can be recognized are provided in the table 1 shown in FIG. 9.

Exemplary embodiments include a method for Ethernet virtualization using assisted frame correction. The method comprises receiving at a host adapter data packets from a network, storing the received data packets in host memory, storing the received data packets in a hardware queue located on the host adapter, setting a status indicator reflecting the status of the data packets based on results of the checking, and sending the status indicator to the host memory.

A system and a computer program product corresponding to the above-summarized method is also described and claimed herein. Other systems, methods, computer program products according to embodiments will be or become apparent to one with skill in the art upon review of the following drawings and detailed description. It is intended that all such additional systems, methods, computer program products, and/or hardware products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Referring now to the drawings wherein like elements are numbered alike in the several FIGURES:

FIG. 9 is a table of error event/conditions and corresponding descriptions.

The detailed description explains the preferred embodiments of the invention, together with advantages and features, by way of example with reference to the drawings.

DETAILED DESCRIPTION OF EXEMPLARY EMBODIMENTS

An exemplary embodiment of the present invention permits a hardware Ethernet virtualization router which serves a large number of communications channels to maintain high bandwidth by ensuring that packets can continue moving. The router avoids having to place back pressure on the network or having to drop packets, which are undesirable alternatives to moving packets. Thus, the technical effects and benefits include allowing an Ethernet virtualization router servicing any number of communications channels to continually move traffic efficiently regardless of packet types or shortages in channel-specific resources. High bandwidth can be maintained in spite of the unpredictable and bursty traffic patterns inherent to Ethernet networks. Packet order is maintained on a host-by-host basis and does not stall the flow of packets to one virtual machine because of a shortage of resources required for another virtual machine. Packets requiring special attention, such as multicast packets, packets for which connections cannot be determined by a parser, or address resolution protocol (ARP) packets, may also be handled using the methods disclosed herein.

Figure 1A:
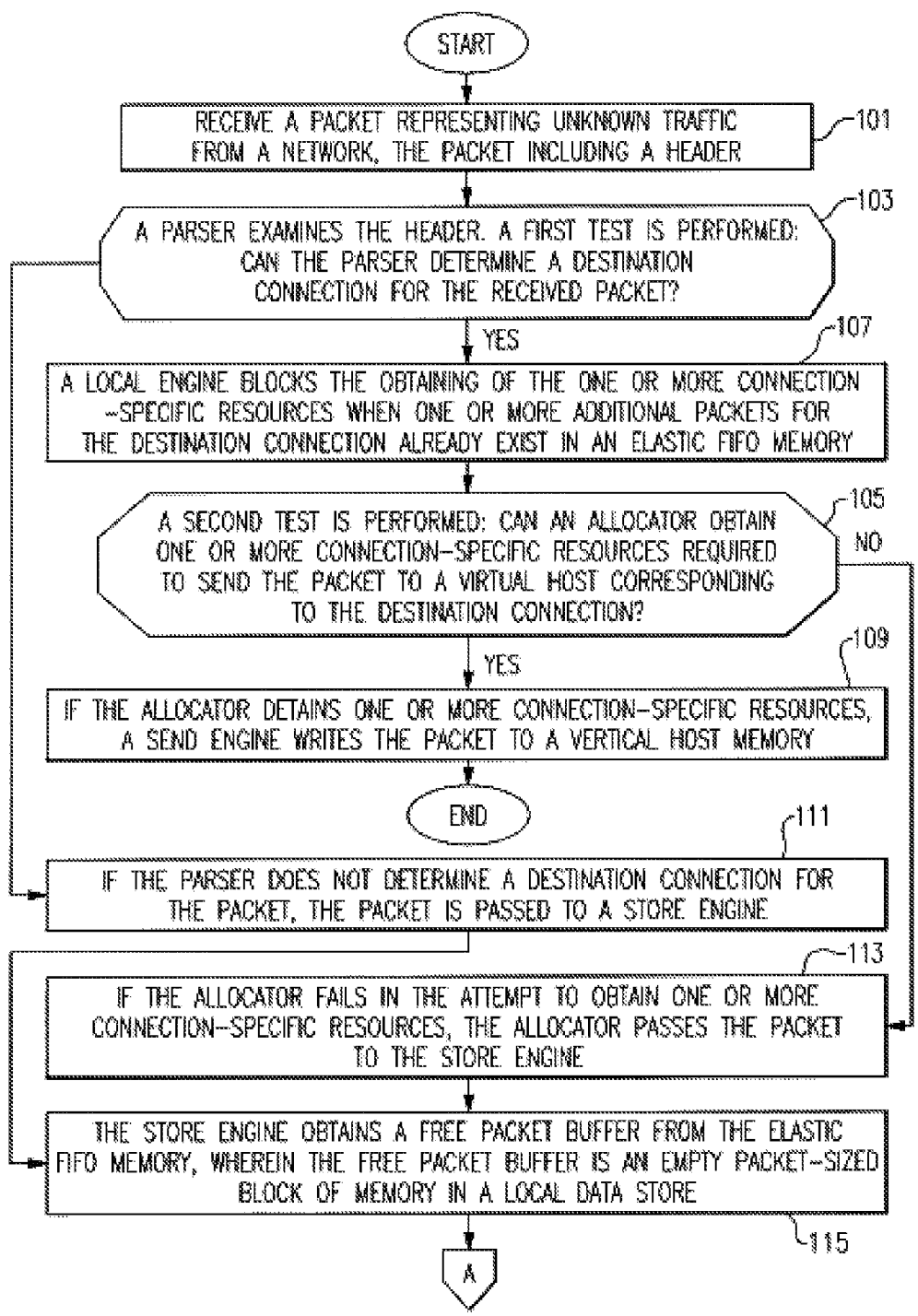
FIGS. 1A and 1B together comprise a flowchart setting forth an illustrative operational sequence for Ethernet virtualization to facilitate flow of unknown traffic to a virtual host.
Figure 1B:
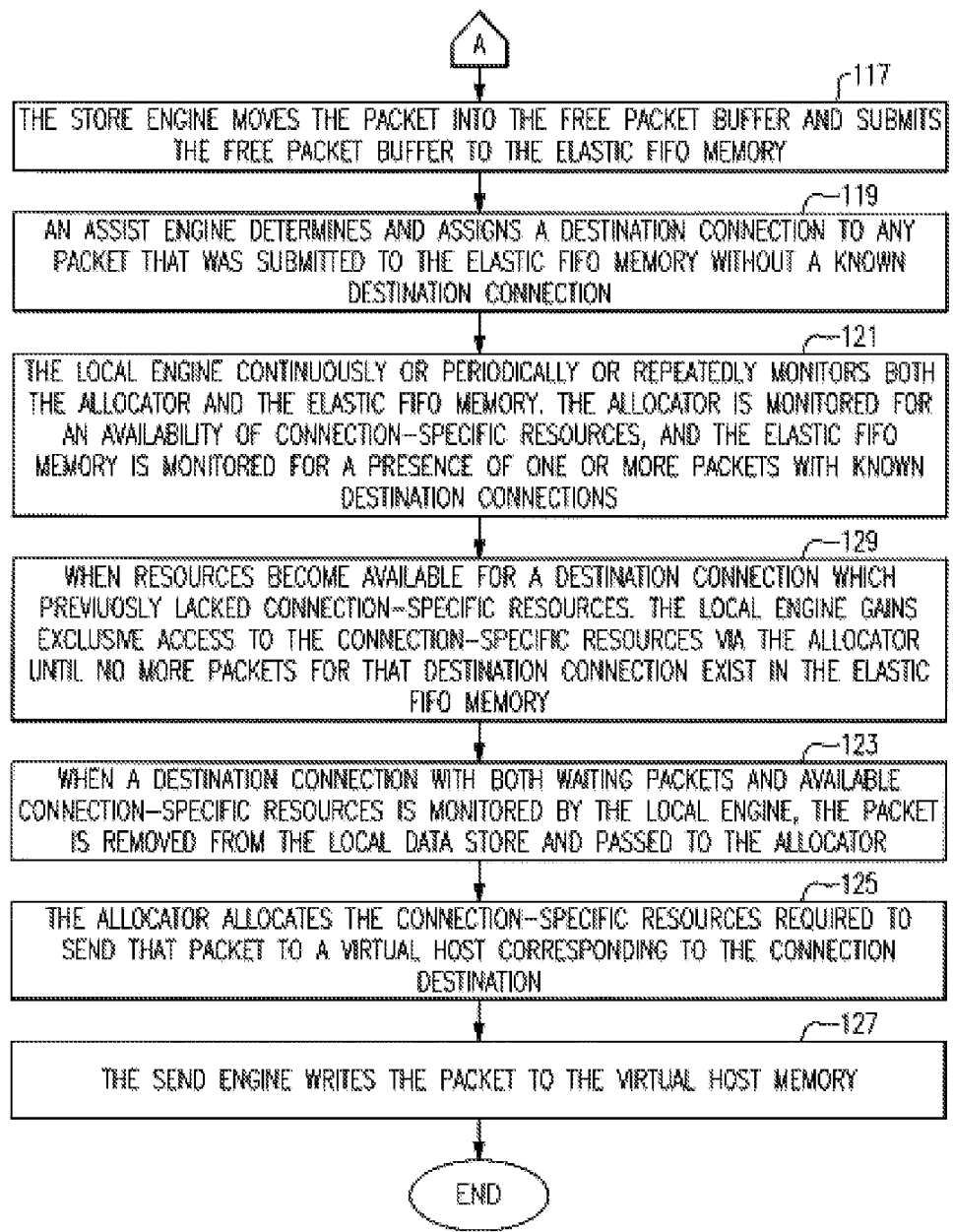
Figure 2:
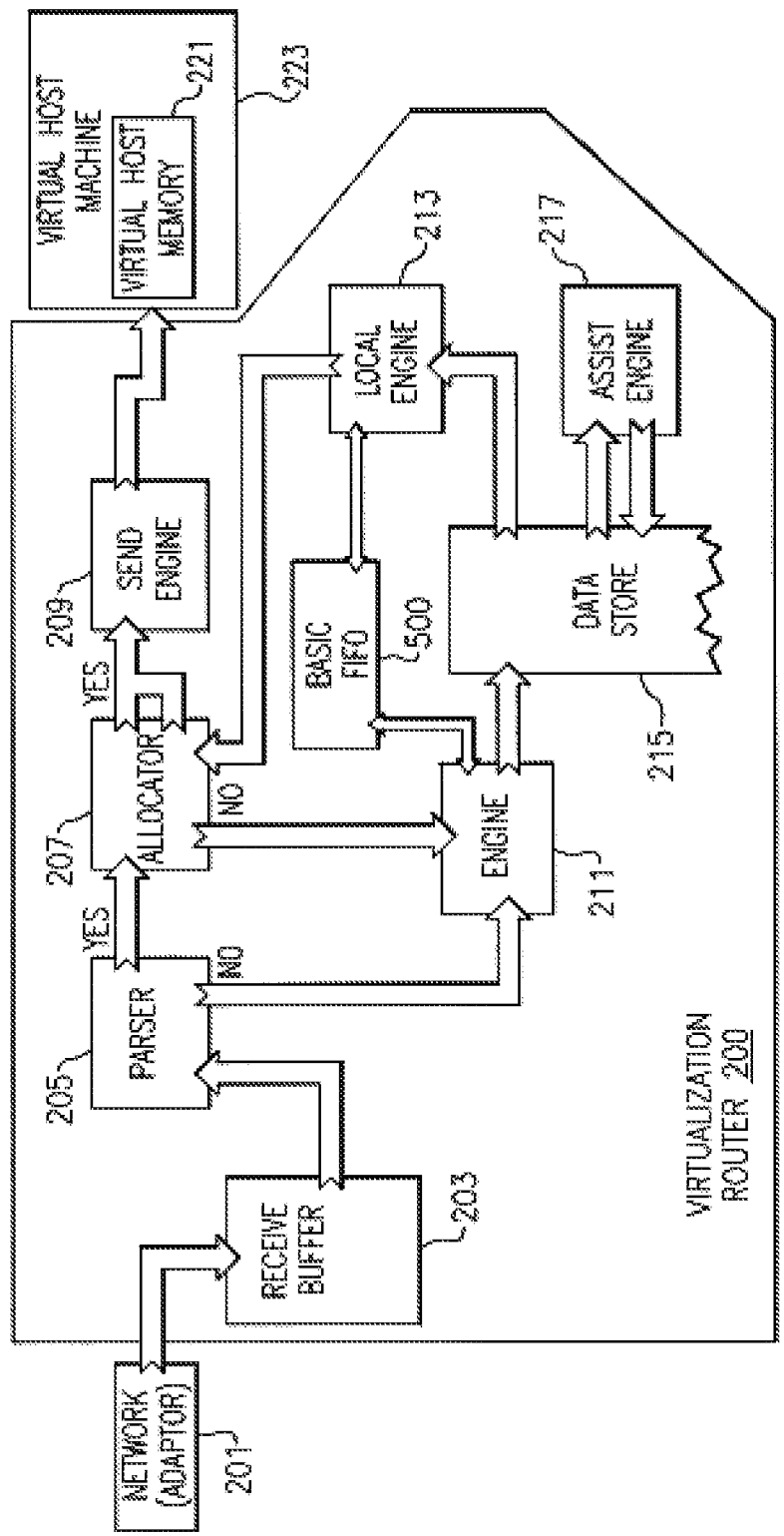
FIG. 2 is a block diagram setting forth an illustrative system for Ethernet virtualization to facilitate flow of unknown traffic to a virtual host.

FIGS. 1A and 1B together comprise a flowchart setting forth an illustrative operational sequence for Ethernet virtualization to facilitate flow of unknown traffic to a virtual host, and FIG. 2 is a block diagram setting forth an illustrative system for Ethernet virtualization to facilitate flow of unknown traffic to a virtual host. Although FIGS. 1A and 1B show a linearly sequential series of operations, this is solely for purposes of clarity and illustration, as some of the steps could be performed in parallel or in a sequence other than what is shown in FIGS. 1A and 1B. The operational sequence of FIGS. 1A and 1B commences at block 101 (FIG. 1A) where a packet is received that represents unknown traffic destined for a virtual host. The packet is received from a network. The received packet includes a header. Illustratively, the received packet may be written into a relatively small optional receive buffer 203 (FIG. 2) as the packet arrives from a network adapter 201. The receive buffer 203 is not strictly required.

At block 103 (FIG. 1A), a parser 205 (FIG. 2) examines each packet's headers (for example, layer 2, layer 3, etc.) and a first test is performed to ascertain whether or not a destination connection can be determined for the received packet. The affirmative branch from block 103 leads to block 107, and the negative branch from block 103 leads to block 111 (described in greater detail hereinafter). If the parser 205 (FIG. 2) can determine a destination connection for the packet, following block 107 at block 105 (FIG. 1A), a second test is performed to ascertain whether or not one or more connection-specific resources required to send the packet to a virtual host memory corresponding to the destination connection are available. The one or more connection-specific resources are available if they can be obtained for allocation by a resource allocation mechanism such as an allocator 207 (FIG. 2). For example, the allocator 207 attempts to obtain one or more connection-specific resources required to send that packet to a virtual machine 223 that corresponds to the destination connection. Note that the terms "virtual machine" and "virtual host" are used interchangeably herein. The affirmative branch from block 105 leads to block 109 (to be described in greater detail hereinafter), whereas the negative branch from block 105 leads to block 113 (to be described in greater detail hereinafter).

Although the illustrative configuration of FIG. 2 shows one virtual machine 223, this is for purposes of clarity, as the system of FIG. 2 may contain a plurality of virtual machines. For example, a practical system may include hundreds or thousands of virtual machines. With hundreds or thousands of virtual machines running on a single physical host, there may be scattered shortages of resources for some small subset of the virtual machines at any given time. Within the physical machine, a hypervisor may allocate differing resources to different virtual machines. For example, some virtual machines may have higher priority and therefore get more time-slices than others. Or, some virtual machines may have more physical storage allocated for use as receive buffers. A real-world system hosting thousands of virtual machines may not operate perfectly at all times with regard to resource management. Likewise, scattered resource shortages may be attributed to the inherently bursty nature of Ethernet traffic.

At block 107 (FIG. 1A), a local engine 213 (FIG. 2) blocks the allocator 207 from allocating resources to new packets when packets for the same connection already exist within an elastic first-in, first-out (FIFO) 500 memory because of a previous lack of resources. At block 109 (FIG. 1A), if the allocator 207 is successful in obtaining the resources, a send engine 209 (FIG. 2) writes the packet to a virtual host memory 221 associated with the virtual machine 223. If the parser 205 does not determine the packet's connection (FIG. 1A, block 111), it passes the packet to a store engine 211 (FIG. 2). At block 113 (FIG. 1A), if the allocator 207 (FIG. 2) fails in its attempt to obtain the required resources (which could be because the resources are not available or because the local engine currently has priority access to those resources), the allocator 207 passes the packet to the store engine 211.

Next, at block 115 (FIG. 1A), for each packet it is to service, the store engine 211 (FIG. 2) obtains a free packet buffer from the elastic FIFO 500. A free packet buffer is an empty packet-sized block of memory in a local data store 215. The store engine 211 moves the packet into that buffer (FIG. 1B, block 117) and submits the used buffer to the elastic FIFO 500 (FIG. 2). If a free packet buffer resource is not available, the packet is dropped or, optionally, the store engine 211 can wait for that shared resource to become available provided sufficient buffering, such as the receive buffer, is available. Since a packet's connection must be determined before it can be sent to the virtual host memory 221, at block 119 (FIG. 1B) an assist engine 217 (FIG. 2) determines and assigns connections to packets that were submitted to the elastic FIFO 500 without known connections (i.e. those packets which arrived from the parser 205).

The procedure of FIGS. 1A and 1B progresses to block 121 (FIG. 1B) where the local engine 213 (FIG. 2) continuously or periodically or repeatedly monitors both the allocator 207 for connection-specific resources and the elastic FIFO 500 for the presence of packets with known destination connections. When resources become available for a connection which had previously lacked resources, block 129, the local engine 213 (FIG. 2) gains exclusive access to those resources, via the allocator 207, until no more packets for that connection exist in the elastic FIFO 500. The operations of block 129 (FIG. 1B) are critical to maintaining packet order within destination connections. At block 123 (FIG. 1B), when a connection with both waiting packets and available resources is seen, the packet is removed from the local data store 215 (FIG. 2) and passed to the allocator 207. The allocator 207 allocates the connection-specific resources required to send that packet to a virtual machine 223 corresponding to the connection destination (FIG. 1B, block 125). Since the local engine 213 (FIG. 2) already determined that the resources were available and claimed them for the packet, the allocator 207 is successful and the packet is written to virtual host memory 221 by the send engine 209 at block 127 (FIG. 1B).

Figure 6:
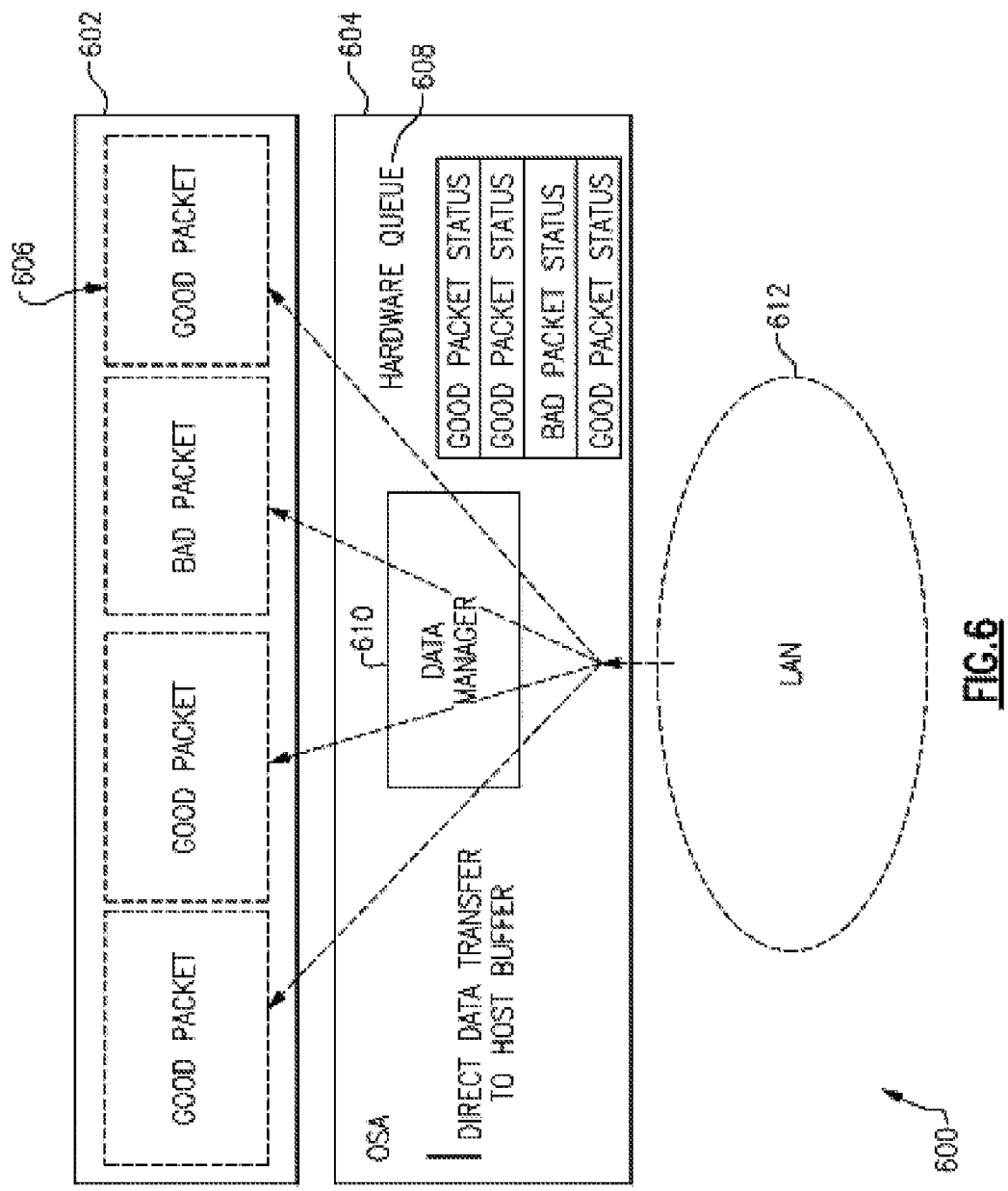
FIG. 6 is a block diagram showing packets allocated into host memory. New packets may be stored before previous packets are known to be good.
Figure 7:
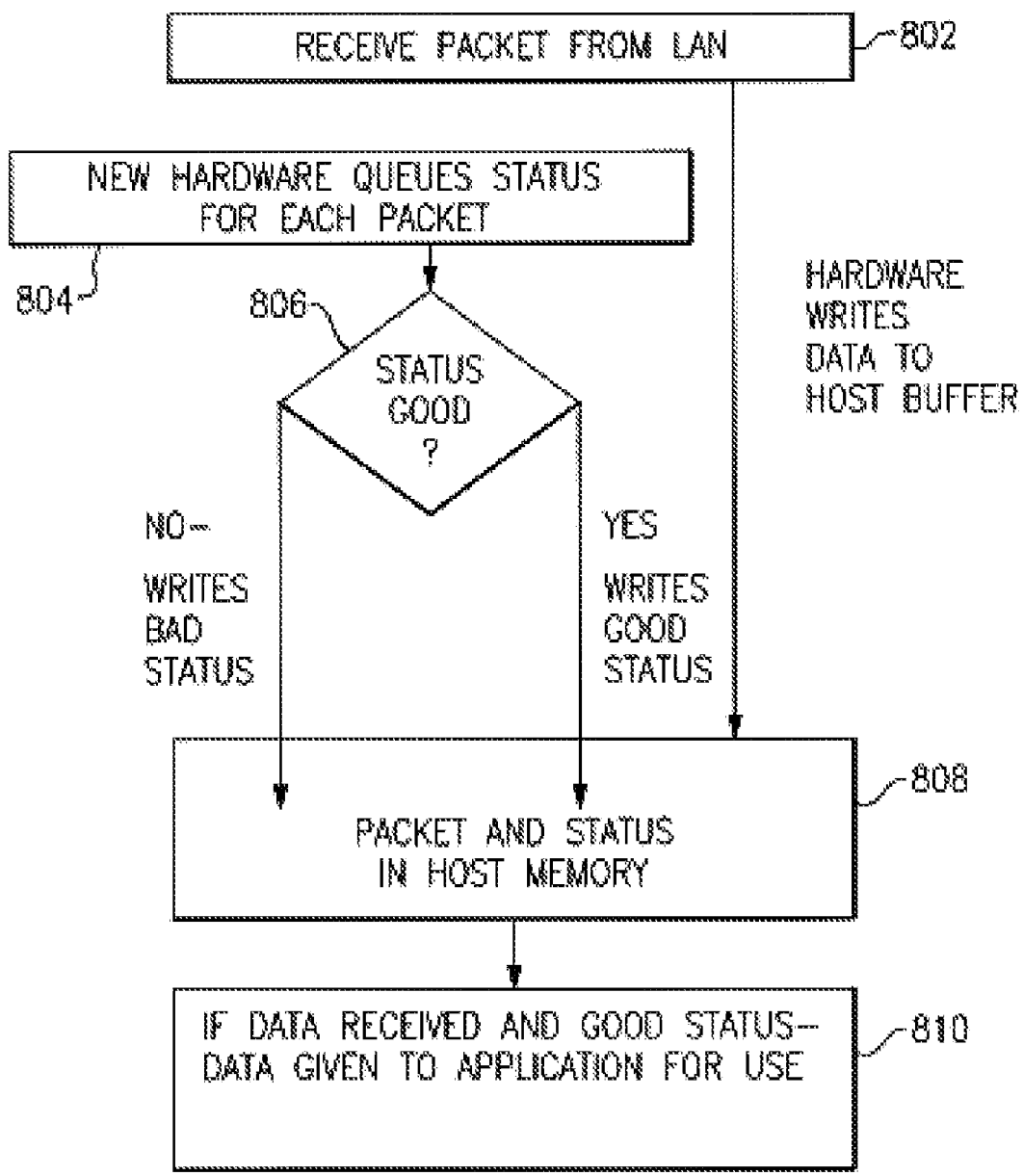
FIG. 7 is a flowchart illustrating the operational sequence storing status information about the packet.

The parser 205 (FIG. 2), allocator 207, send engine 209, store engine 211, local engine 213, local data store 215, elastic FIFO 500, and assist engine 217 together comprise a virtualization router 200. The router 200 is referred to as a virtualization router because it supports communication channels to a plurality of virtual machines which are called destination connections, such as virtual machine 223, providing the illusion to each virtual machine 223 that it possesses its own network interface card (such as the network adapter 201), when in fact only a single high-speed adapter (i.e., the network adapter 201) is present. The network adapter 201 is run in promiscuous mode to receive all packets off the network. The router 200 determines the correct connection for each packet and moves the packet to a memory space (i.e., virtual host memory 221) of a corresponding virtual machine 223. As illustrated in FIGS. 6 & 7, the control-flow override function may intercept control signals within the virtualization router (200) to modify or enhance its function. A possible embodiment would change the parser 205 (FIG. 2) to handle different types of packets.

Inbound Ethernet traffic flow is inherently bursty. Multiple shared and non-shared resources are required for each connection in order to move its packets. With inherently limited resources which must be carefully managed, one of the functions performed by the router 200 is to handle the bursty traffic in such a way as to minimize packet loss and retransmission for each connection in the context of virtual hosts, thereby maximizing network efficiency.

Figure 3:
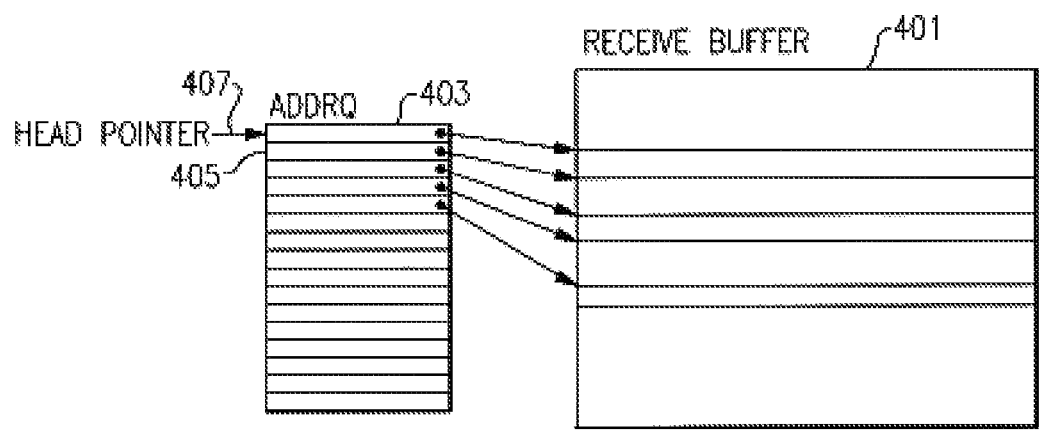
FIG. 3 is a data structure diagram setting forth an illustrative receive buffer for use with the system of FIG. 2.

FIG. 3 is a data structure diagram setting forth an illustrative receive buffer 401 for implementing the optional receive buffer 203 of FIG. 2. Incoming bursts of packet data are initially written directly into the receive buffer 401 (FIG. 3), which is managed with a queue of records called an addrq 403. Each record 405 contains various information about a burst including a pointer into the receive buffer 401 where the data was written. All packets are removed from the receive buffer 401 in the same order that they were previously written (as the packets arrived from the network adapter 201, FIG. 2). If the packet at the head of the addrq 403 (FIG. 3) as indicated by a head pointer 407 is not a type of packet that requires special handling and if all required resources are available to move the packet, the packet is sent directly to its connection destination (virtual host memory 221, FIG. 2). Otherwise, if the packet is a special type or if one or more of the resources is not available, the packet is sent to the elastic FIFO 500.

As the head pointer 407 (FIG. 3) moves forward (i.e., in a downward direction wherein FIG. 3 is oriented such that the reference numerals are upright), packets for connections with ample resources continue to be sent directly to their connection destinations even while packets for other connections without resources are sent to the elastic FIFO 500 (FIG. 2). Similarly, by the same mechanism, packets that do not require special consideration can be sent directly to their destinations while packets that require extra processing (e.g. multicast packets) can be sent to the elastic FIFO 500 to be serviced by an independently-running assist engine. In this way, the flow of all packets continues through the router 200 consistently without stalls or hesitations.

Figure 4:
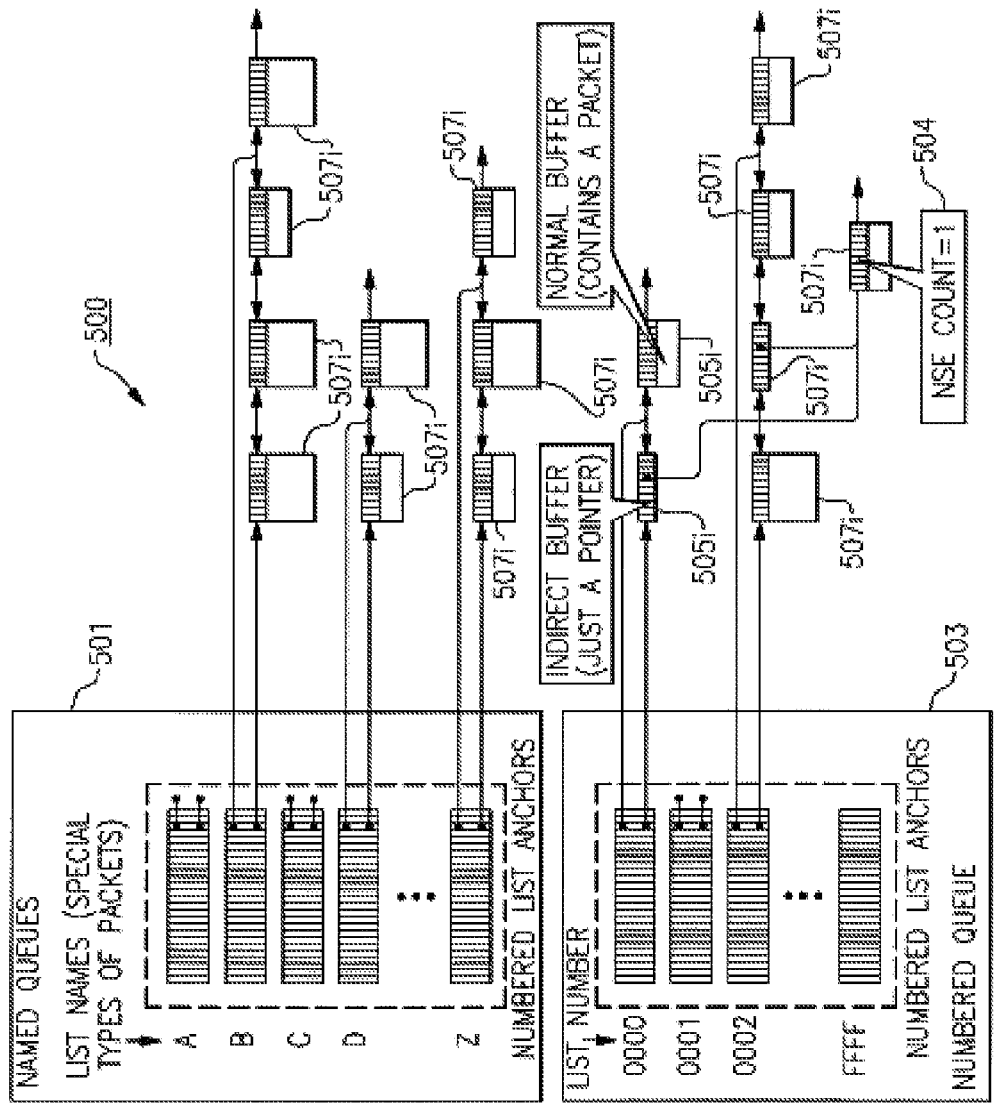
FIG. 4 is a data structure diagram setting forth an illustrative elastic FIFO for use with the system of FIG. 2.

FIG. 4 is a data structure diagram setting forth an illustrative elastic FIFO 500 memory (FIGS. 2 and 4) for use with the system of FIG. 2 and the method of FIG. 1. The elastic FIFO 500 (FIG. 4) includes a large array of linked lists of packet buffers, as well as all the functionality required to maintain those lists and allow them to be put to a useful purpose. The elastic FIFO 500 serves to manage the flow of packets that can not be sent directly from the receive buffer 203 (FIG. 2) to one of the virtual machines such as the virtual machine 223. The elastic FIFO 500 (FIG. 4) is called "elastic" because it changes shape with changes in either or both of: (a) the number of active connections, or (b) the total number of packets contained by the FIFO. In its entirety, the memory footprint of the elastic FIFO 500 can be increased or decreased over time as free buffers are dynamically added or removed.

The elastic FIFO 500 is also called "elastic" because it is actually a collection of queues on which packet buffers and pointers to packet buffers are held. These pointers to packet buffers are shown in FIG. 4 as indirect buffers 505.i, where i is any positive integer greater than zero. The packet buffers are shown in FIG. 4 as normal buffers 507.j where j is any positive integer greater than zero. There are named queues 501 for free normal buffers 507.j of various sizes. These named queues 501 also include a named queue for free indirect buffers 505.i. Indirect buffers 505.i only occupy a small amount of memory, as they merely point to a normal buffer 507.j, but these indirect buffers 505.i do occupy some memory and are thus obtained as needed from the free list so that they may be enqueued to a numbered list. Since the elastic FIFO 500 is elastic, additional free indirect buffers 505.i can be added as necessary, and these buffers may also be taken away if the free list becomes excessively long. There is no direct relationship between the total number of indirect buffers 505.i and normal buffers 507.j. At any given time, some number of the normal buffers 507.j will be occupied by packets, though ideally most should be free most of the time.

There are two categories of queues within the elastic FIFO 500: named queues 501 and numbered queues 503. When a packet is sent to the elastic FIFO 500 because it requires special consideration, it is placed on a named queue of named queues 501, as opposed to being placed on a numbered connection queue of numbered queues 503. Each named queue of named queues 501 includes a list name A, B, C, D, Z that reflects a special packet type placed on that queue. Packets placed on named queues 501 must ultimately be moved to numbered queues 503. Packets on a numbered queue of numbered queues 503 can be sent to a corresponding destination connection's virtual host memory 221 (FIG. 2) as soon as the required connection-specific resources are available.

Named queues 501 (FIG. 4) are also used for implementing pools of various types of free buffers, which are buffers that are not currently associated with a packet. A free buffer is obtained for each packet that is to be locally stored, and that buffer is returned to the pool from which it originated once the packet has been removed from local storage and sent to virtual host memory 221 (FIG. 2). When the special packet type is multicast or broadcast, the packet must be moved from a "multicast" or "broadcast" named queue of named queues 501 (FIG. 4) to a plurality of numbered queues in numbered queues 503 so it may be sent to multiple virtual machines including virtual machine 223 (FIG. 2), wherein potentially thousands of such virtual machines are present. The assist engine 217 efficiently performs this task through the use of indirect buffers 505.i (FIG. 4).

There are two types of packet buffers that may be put on a numbered queue of numbered queues 503: normal buffers 507.j and indirect buffers 505.i. Indirect buffers 505.i do not contain data themselves, but merely point to a normal buffer 507.j. The assist engine 217 (FIG. 2) removes a normal buffer 507.j (FIG. 4) from a named queue of named queues 501, obtains multiple free indirect buffers 505.i from the elastic FIFO 500, points those indirect buffers 505.i at the normal buffer 507.j, and enqueues those indirect buffers 505.i to the appropriate numbered queues 503.

Every normal buffer 507.j carries a use count 509. A normal buffer's use count 509 is usually 1 but can be higher when the normal buffer 507.j is the target of an indirect buffer 505.i. A normal buffer 507.j that is directly sitting on a queue has a use count of 1, while a normal buffer 507.j pointed to by one or more indirect buffers 505.i (which are sitting on one or more queues) has a use count equal to the number of indirect buffers 505.i pointing to it. A normal buffer 507.j that is the target of an indirect buffer 505.i can not itself directly exist on any queue. Each time a copy of the packet in the normal buffer 507.j is sent to virtual host memory 221 (FIG. 2), an indirect buffer 505.i (FIG. 4) pointing to it is removed from a numbered queue of numbered queues 503 and the normal buffer's use count 509 is decremented by 1 (provided it is still greater than 1). When the normal buffer's use count 509 reaches 1, it is returned to the pool of free normal buffers 507.j at the same time a final indirect buffer 505.i pointing to the normal buffer 507.j is dequeued and returned to the pool of free indirect buffers 505.i.

The local engine 213 (FIG. 2) performs the task of dequeuing buffers from the numbered queues 503 (FIG. 4), via the interface provided by the elastic FIFO 500, so the packets contained within or pointed to by those buffers can be sent to virtual host memory 221 (FIG. 2). As soon as the allocator 207 fails to obtain virtual host memory 221 for one packet for a given connection, it must send all subsequent packets for that connection to the local data store 215 in order to maintain packet order for that connection. One task performed by the local engine 213 is to empty queues containing packets that have accumulated, due to resource shortages, so packets may once again flow directly from the network adapter 201 to virtual host memory 221, i.e. without being stored first. The local engine 213 obtains exclusive access to connection-specific resources until the local engine determines that it has emptied a destination connection's queue and relinquishes that exclusivity.

Figure 5:
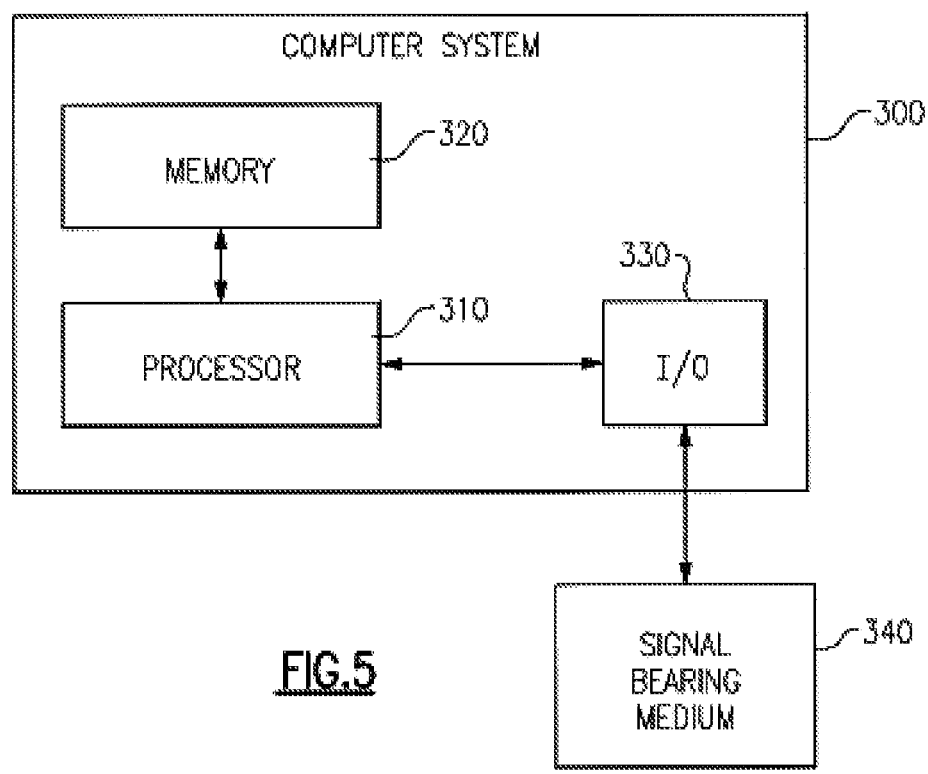
FIG. 5 is a block diagram setting forth an illustrative computer program product or hardware product for Ethernet virtualization to facilitate flow of unknown traffic to a virtual host.

FIG. 5 is a block diagram setting forth an illustrative computer program product or hardware product for Ethernet virtualization using an elastic FIFO memory to facilitate flow of unknown traffic to a virtual host. The system includes a computer 300 operatively coupled to a signal bearing medium 340 via an input/output interface (I/O) 330. The signal bearing medium 340 may include a representation of instructions for Ethernet virtualization using an elastic FIFO memory to facilitate flow of unknown traffic to a virtual host, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes information for Ethernet virtualization using an elastic FIFO memory to facilitate flow of unknown traffic to a virtual host, wherein the information is represented, e.g., on the signal bearing medium 340 and communicated to the computer 300 via the I/O 330, wherein the processor 310 saves information as appropriate into a memory 320. Illustratively, the processor 310 corresponds to the processing mechanism 106 of FIG. 1. Returning now to FIG. 6, this information may also be saved into the memory 320, e.g., via communication with the I/O 330 and the signal bearing medium 340.

The processor 310 executes a program for implementing Ethernet virtualization to facilitate flow of unknown traffic to a virtual host. The processor 310 implements instructions for receiving a packet that represents unknown traffic destined for a virtual host on a network; performing a first test to ascertain whether or not a destination connection can be determined for the received packet wherein, if a destination connection can be determined, a second test is performed to ascertain whether or not one or more connection-specific resources required to send the packet to a virtual host memory corresponding to the destination connection are available; if a destination connection for the packet cannot be determined, passing the packet to a store engine; if the one or more connection-specific resources are not available, passing the packet to the store engine; the store engine obtaining a free packet buffer from an elastic first-in, first-out (FIFO) memory, wherein the free packet buffer is an empty packet-sized block of memory in a local data store; the store engine moving the packet into the free packet buffer and submitting the free packet buffer to the elastic FIFO memory; performing a monitoring procedure to detect both an availability of connection-specific resources and a presence of one or more waiting packets with a known destination connection; when a destination connection with: (i) one or more waiting packets, and (ii) available connection-specific resources; are both detected, removing the packet from the local data store; allocating the one or more connection-specific resources required to send the packet to the virtual host memory corresponding to the connection destination; and writing the packet to the virtual host memory. The foregoing steps may be implemented as a program or sequence of instructions within the memory 320, or on a signal bearing medium, such as the medium 340, and executed by the processor 310.

FIG. 6 is a system 600 configured to store packets in host memory. The system comprises a host adapter 604 configured to transmit and receive packets over a network 612 such as a local area network (LAN). The host adapter 604 includes host memory 602 which may be configured as virtual host memory. A host machine (not shown) having a host operating system (OS) is coupled to the host memory. Packets are stored to virtual host memory as soon as they arrive from the adapter 604. The host adapter 604 includes a data manager 610 for handling the operation of the adapter including processing data packets from the network and a hardware queue 608 for each received packet. The data manager 601 is configured to manage the data coming in from the network. For example, the data manager checks the received data for error conditions such as those listed in table 1 of FIG. 9. The data manager also stores packets in the hardware queue 608 and forwards packets to the host memory 602 for further processing by the host. In one embodiment, these techniques are implemented as part of the router 200 of FIG. 2 and host adapter 201 of FIG. 2. For example, the send engine 209 can incorporate these techniques.

In one embodiment, the host adapter 604 can refer to a hardware adapter that includes the data router 200 of FIG. 2. Host memory 602 refers to memory that the Host OS can access locally. It is used as the buffer space for each packet to be stored in from the LAN. The memory written into can reside in one of many logical partitions. In this way, one common hardware interface, the data router, can transfer packets into many partitions at once. To the end user, or client, each logical partition looks like it has its own hardware interface. A set of rules can be defined to the data router, such as address filtering and error detection, to enable efficient transfer of data (packets) from the LAN to host. In this application, the term packets and frames are used in an interchangeable manner.

FIG. 7 is a flow chart 700 of the operation of the data manager 610 of FIG. 6 according to an embodiment of the present invention. Packets are received from the network (LAN) 612 that are in error or match a condition outlined in the table 1 of FIG. 9. Internal hardware algorithms can use the error or conditions in the table to decide an action for the incoming packet. It could be discarded silently, or transfer to host with the status written back as in error. The host OS can then decide what to do with the packet data. Thresholding can be performed on the type of errors received and software could be written to monitor what was occurring on the LAN link. Service providers could use this information to monitor LAN performance and reliability.

The flow chart illustrates how the hardware queue can be constantly updated with the latest state information from the host adapter 604. In operation, at block 802, the data manager 610 of the host adapter 604 receives data packets from the network 612 and forwards the packets 606 to the host memory 602. At block 804, the data manager checks the packets for error conditions such as those listed in table 1 of FIG. 9. If an error is detected, then the data manager updates the status of the packet as a Bad Status. In addition, once an error is detected, then the packet is pulled off the queue and the host status block is marked as invalid. Once the error is cleared the queue is reassembled and data transfer continues. On the other hand, at block 806, if the packet is not in error, then the data manager marks the packet as Good Status. In either event, at block 808, the data manger writes the status (good or bad) to the host memory. At block 810, if data received that has a Good Status, then the data is forwarded to an application for further processing.

Figure 8:
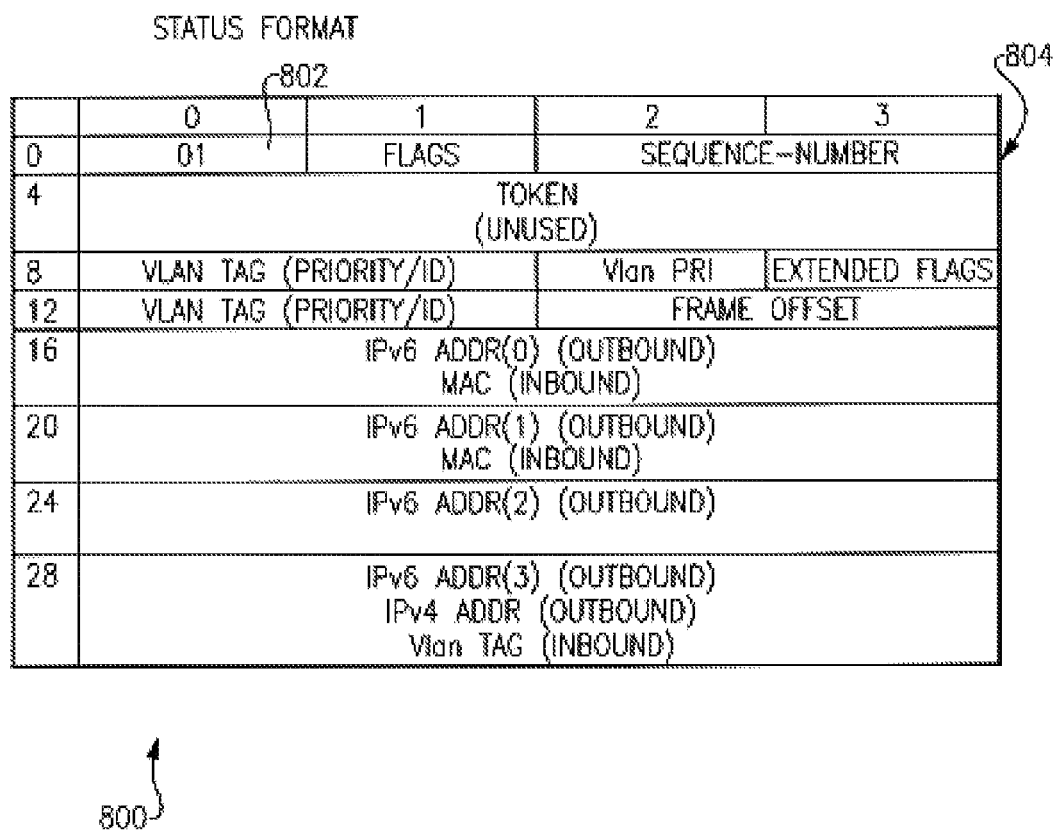
FIG. 8 is illustrative of a possible embodiment of a status block.

FIG. 8 depicts a status block 800 in accordance with an embodiment of the present invention. The status block 800 is stored in the host memory for each received packet. In one embodiment, an error or event is represented by the setting of the high order bit (802) in byte 0 of the status field 804, however, in other embodiments, the status could be stored in any location either inline with the data or in a separate status area. Below is a description of the fields of the status block.

| Byte offset | Definition |
|---|---|
| 0 | Header Format (01) |
| 1 | Flags: IP Address Type indicates v4 or v6 addressing |
| 2 | Sequence-number: This field increments once for each packet. |
| 4 | Token: This field contains a value unique to this connection. It is set by firmware and used in each inbound header. It is ignored in the outbound direction. |
| 8 | Data Length: These two bytes contain the length of the packet following this header. (The length of this header is not included) |
| 10 | VLAN priority - used to set priority of vlan null tagged frame |
| 11 | Extended Flags: Transport frame type (UDP or TCP), Transport Request: Calculate the checksum on the data part of the packet, Header Request: Calculate the checksum on just the header, MAC address, VLAN Tag present, VLAN Frame (VLAN tag present) |
| 12 | VLAN Tag: This field contains the VLAN tag from the packet's MAC header. (The field consists of the user-priority field, the Canonical Format Indicator (CFI), and the VLAN-id). |
| 14 | Frame Offset: When the Frame pass-thru flag is set, this field contains the offset from the start of the MAC frame to the IP header. |
| 16 | Address (IPv4, IPv6, MAC): Used to exchange packet addresses. The flags and extended-flags indicate which value is present. The usage of the field depends upon whether the data flow in "inbound" (to the host) or "outbound" (to the network). |

It should be noted that the above techniques can be used with the computer system 300 and signal bearing medium 340 of FIG. 5.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

We claim:

1. A method for implementing Ethernet virtualization, the method comprising:

receiving, by a host adapter, a packet destined for a virtual host on a network, the packet having an error status;

storing, by the host adapter, the packet in a host memory, the storing comprising writing the packet to the host memory;

subsequent to the storing, performing (a), (b), and (c):
 (a) checking the packet for an error condition;
 (b) updating the error status of the packet based upon the checking; and
 (c) writing only the error status of the packet to the host memory;

based on a resource being available, writing the packet to a virtual host memory corresponding to the destination connection, the resource being a required resource for sending the packet to a virtual host corresponding to a destination connection, the availability of the resource based on factors comprising priority of the virtual host and physical storage size allocated for use by the virtual host; and based on the resource not being available, passing the packet to a store engine.

2. The method of claim 1, wherein the host memory is configured as a virtual host memory.

3. The method of claim 1, wherein the host adapter further comprises a hardware queue for each received packet for storing packets.

4. The method of claim 1, wherein a host operating system accesses the host memory locally to use said host memory as buffer space for each stored packet.

5. The method of claim 1, wherein responsive to an error, an internal hardware algorithm causes the packet to be discarded.

6. The method of claim 1, wherein responsive to an error, the internal hardware algorithm causes the packet to be transferred to the host.

7. The method of claim 3, further comprising:
responsive to an error, updating the error status of the packet as Bad;
responsive to an error, removing the packet from the queue, and writing the error status to the host memory.

8. The method of claim 3, further comprising:
responsive to a packet not in error, marking the error status of the packet as Good and writing the error status to the host memory.

9. The method of claim 1, further comprising:
based on the resource not being available, passing a subsequent packet to the store engine, the subsequent packet destined for the same virtual host corresponding to the same destination connection as the packet.

10. A computer program product for implementing Ethernet virtualization, the computer program product comprising a computer readable non-transitory storage medium having computer readable program code embodied therewith, the computer readable program code configured to carry out a method, the method comprising:
receiving, by a host adapter, a packet destined for a virtual host on a network, the packet having an error status;
storing, by the host adapter, the packet in a host memory, the storing comprising writing the packet to the host memory;
subsequent to the storing, performing (a), (b), (c), and (d):
(a) checking the packet for an error condition;
(b) updating the error status of the packet based upon the checking;
(c) writing only the error status of the packet to the host memory; and
(d) responsive to an error condition being found, deciding, by an internal hardware algorithm, an action for the incoming packet;
based on a resource being available, writing the packet to a virtual host memory corresponding to the destination connection, the resource being a required resource for sending the packet to a virtual host corresponding to a destination connection, the availability of the resource based on factors comprising priority of the virtual host and physical storage size allocated for use by the virtual host; and
based on the resource not being available, passing the packet to a store engine.

11. A device for implementing Ethernet virtualization, the device comprising a host adapter having network connection, the host adapter comprising a data manager circuit, the device configured to carry out a method, the method comprising:
receiving, a packet destined for a virtual host on a network, the packet having an error status;
storing the packet in a host memory, the storing comprising writing the packet to the host memory;
subsequent to the storing, performing (a), (b), (c), and (d):
(a) checking, the packet for an error condition;
(b) updating the error status of the packet based upon the checking;
(c) writing only the error status of the packet to the host memory; and
(d) responsive to an error condition being found, deciding, by an internal hardware algorithm, an action for the incoming packet;
based on a resource required to send the packet to a virtual host corresponding to the destination connection being available, the host adapter writes the packet to a virtual host memory corresponding to the destination connection, wherein the availability of the resource is based on factors comprising priority of the virtual host and physical storage size allocated for use by the virtual host; and
based on the destination connection for the packet not being available, the host adapter passes the packet to a store engine.

12. The device of claim 11, wherein the host memory is configured as a virtual host memory.

13. The device of claim 11, wherein the data manager further comprises a hardware queue for each received packet for storing packets.

14. The device of claim 11, wherein a host operating system can access the host memory locally to use said host memory as buffer space for each stored packet.

15. The device of claim 11, wherein responsive to an error, the internal hardware algorithms discard the packet.

16. The device of claim 11, wherein responsive to an error, the internal hardware algorithms transfer the packet to the host.

17. The device of claim 13, further comprising:
responsive to an error, the data manager updates the error status of the packet as Bad;
responsive to an error, the data manager removes the packet from the queue and writes the error status to the host memory.

18. The device of claim 11, further comprising:
responsive to a packet not in error, the data manager marks the error status of the packet as Good and writes the error status to the host memory.

19. The device of claim 11, further comprising:
based on the destination connection for the packet not being available, the host adapter passes a subsequent packet to the store engine, the subsequent packet destined for the same virtual host corresponding to the same destination connection as the packet.

* * * * *